United States Patent
Zampini, II et al.

(10) Patent No.: US 8,690,383 B2
(45) Date of Patent: Apr. 8, 2014

(54) COLLIMATING AND CONTROLLING LIGHT PRODUCED BY LIGHT EMITTING DIODES

(71) Applicant: Integrated Illumination Systems, Inc., Morris, CT (US)

(72) Inventors: Thomas L. Zampini, II, Bedford, MA (US); Mark A. Zampini, Bedford, MA (US)

(73) Assignee: Integrated Illumination Systesm, Inc., Morris, CT (US)

( * ) Notice: Subject to any disclaimer, the term of this patent is extended or adjusted under 35 U.S.C. 154(b) by 0 days.

(21) Appl. No.: 13/924,770

(22) Filed: Jun. 24, 2013

(65) Prior Publication Data
US 2013/0286647 A1 Oct. 31, 2013

Related U.S. Application Data

(63) Continuation of application No. 12/015,376, filed on Jan. 16, 2008, now Pat. No. 8,469,542, which is a continuation of application No. 10/920,347, filed on Aug. 18, 2004, now abandoned.

(60) Provisional application No. 60/571,895, filed on May 18, 2004.

(51) Int. Cl.
| F21V 9/00 | (2006.01) |
| F21V 1/00 | (2006.01) |
| B60Q 1/26 | (2006.01) |
| F21V 5/00 | (2006.01) |
| F21S 4/00 | (2006.01) |

(52) U.S. Cl.
USPC ...... 362/231; 362/555; 362/217.02; 362/227; 362/244; 362/249.01

(58) Field of Classification Search
USPC ........ 362/231, 555, 217.02, 227, 244, 249.01
See application file for complete search history.

(56) References Cited

U.S. PATENT DOCUMENTS

| 5,032,960 A * | 7/1991 | Katoh ........................... 362/240 |
| 6,880,952 B2 * | 4/2005 | Kiraly et al. ................... 362/218 |
| 2003/0133292 A1 * | 7/2003 | Mueller et al. ................. 362/231 |

* cited by examiner

*Primary Examiner* — David J Makiya
(74) *Attorney, Agent, or Firm* — Foley and Lardner LLP; Christopher J. McKenna

(57) ABSTRACT

A light source channel is described. The light source channel includes an extrusion forming a channel having an open length and a light source positioned within the channel. A light transfer medium is positioned above the light source and covers the open length of the channel. The light transfer medium has a cross section. A method embodiment according to the present invention produces a light source channel by installing a light engine within a channel of an extrusion and covering the channel length with a light transfer medium above the light engine. The light transfer medium has a cross-section.

20 Claims, 3 Drawing Sheets

COLLIMATING AND CONTROLLING LIGHT PRODUCED BY LIGHT EMITTING DIODES

RELATED APPLICATIONS

The present application hereby claims the benefit of and is a continuation of U.S. patent application Ser. No. 12/015,376, entitled "Collimating and Controlling Light Produced by Light Emitting Diodes", filed on Jan. 16, 2008, which claims the benefit of and is a continuation of U.S. patent application Ser. No. 10/920,347, entitled "Collimating and Controlling Light Produced by Light Emitting Diodes", filed on Aug. 18, 2004, which claims the benefit of U.S. Provisional Application No. 60/571,895, filed on May 18, 2004, and hereby incorporates all of these applications herein in their entirety by reference.

FIELD OF THE INVENTION

The present invention relates to collimating and controlling light produced by light emitting sources, and more particularly, to the use of a light transfer medium such as half round lenses and extrusions to collimate and control light produced by light emitting sources, such as light emitting diodes (LEDs), organic light emitting diodes (OLEDs), and light emitting polymers (LEPs).

BACKGROUND

It is known in the art to use LEDs as a light source. Existing linear LED-based light source systems inefficiently scatter and diffuse light within a containing light fixture. It is known that high power LEDs require external/additional heat sinking for transferring heat away from the LEDs in order to promote longevity and efficiency of the LEDs.

SUMMARY

An embodiment according to the present invention provides a light source channel including an extrusion forming a channel having an open length and a light engine positioned within the channel. A light transfer medium positioned above the light engine covers the open length of the extrusion channel. The light transfer medium has a cross section. The extrusion can be of any length, shape, or size.

In a method aspect, an embodiment according to the present invention produces a light source channel by installing a light engine within a channel of an extrusion and covering the channel length with a light transfer medium above the light engine. The light transfer medium has a cross-section.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by 15 limitation, in the figures of the accompanying drawings, wherein elements having the same reference numeral designations represent like elements throughout and wherein.

DETAILED DESCRIPTION

In contrast with the above-described approaches, the mechanism according to an embodiment of the present invention collimates and controls light produced by a light emitting source, e.g., LEDs, OLEDs, and LEPs.

Figure 1:
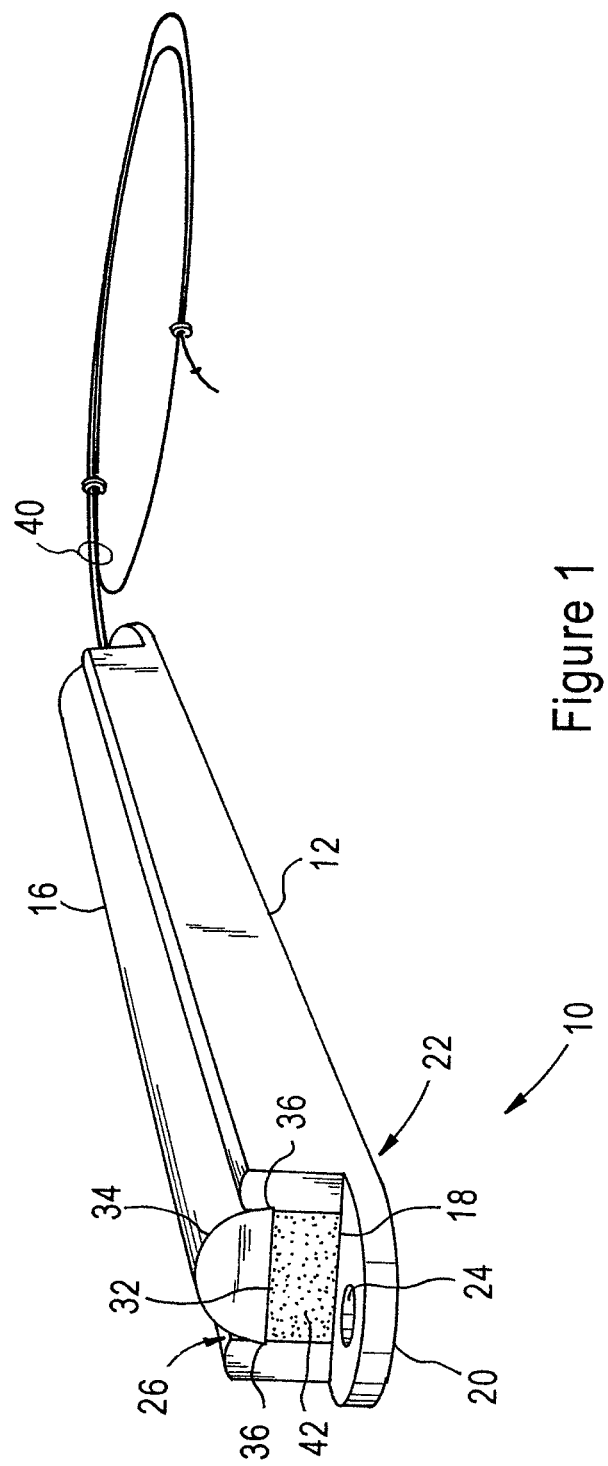
FIG. 1 is a perspective view of an embodiment according to the present invention.

As depicted in FIG. 1, a light source channel 10 according to the present invention includes an extrusion 12, e.g., an aluminum or other metallic material-based extrusion, herein referred to as an "extrusion", a light engine 14 (FIG. 3) having both high and low power, and a light transfer medium 16, e.g., a solid acrylic, polycarbonate, or any other clear plastic/composite half-round. User needs and/or application-specific requirements determine the length of extrusion 12. In one embodiment, extrusion 12 may be cut to any length desired and similarly for light transfer medium 16.

Extrusion 12 includes a channel 18 having a U-shaped cross-section and a pair of attachment ears 20 at either end of extrusion 12. Bottom portion 22 of extrusion 12 extends beyond channel 18 on each end of light source channel 10 and include a defined through-hole 24 for fixing light source channel 10 in position, e.g., using screws, bolts, etc. Light transfer medium 16 is positioned at an upper end 26 of channel 18, corresponding to the open portion of the U-shaped cross-section.

Light engine 14 (FIG. 3) includes LEDs 28 (FIG. 3) mounted, via surface mount, through holes, etc., to a circuit board 30, e.g., a metal core printed circuit board (MCPCB), fiber based PCB, or other circuit board, and circuit board 30 is mounted to the base of extrusion channel 18, e.g., using screws, epoxy, or other attaching mechanism. In one embodiment, an electrically neutral, thermally conductive paste/grease or a thermally conductive epoxy is applied between the extrusion and circuit board 30. In another embodiment, light engine 14 includes OLEDs and/or LEPs in place of or in addition to LEDs 28.

In an alternate embodiment, LEDs 28 are mounted with an FR4 PCB (or flexible circuit as referenced in U.S. Provisional Patent Application No. 60/481,387 filed Sep. 17, 2003, incorporated by reference herein in its entirety) with the slugs of LEDs 28 epoxied directly to the extrusion 12. In this embodiment, extrusion 12 serves as a heat sink for high brightness LEDs 28.

Light transfer medium 16 is a half-round, i.e., semi-circular cross-section shaped, substantially translucent material, e.g., a clear plastic or composite material, having a flat bottom side 32 and a rounded top side 34. As described above, light transfer medium is substantially coextensive with extrusion channel 18. Light transfer medium 16 is polished on bottom side 32 and top side 34 to promote optimal light transfer with minimal diffusion. A securing medium (not shown), e.g., an optical grade epoxy, potting material or any other securing mechanism, securely mounts light transfer medium 16 to extrusion 12 with flat, bottom side 32 positioned slightly above or on the heads of the LEDs 28 and substantially covering upper end 26 of extrusion channel 18.

Additionally, a pair of opposing grooves 36 formed in the inner surface of extrusion channel 18 toward the upper end 26 of the arms forming the U-shaped extrusion channel maintain light transfer medium 16 in position. That is, the corners of light transfer medium 16 formed at the intersection of bottom side 32 and top side 34 fit within opposing grooves 36 preventing the light transfer medium from being removed and/or falling out, depending on the position of light source channel 10. Light transfer medium 16 slides into either end of extrusion channel 18 and within the opposing grooves 36.

In another embodiment, light transfer medium 16 is installed into light source channel 10 via a small ledge on extrusion 12 on which the light transfer medium sits and is adhered to the extrusion via an epoxy, e.g., an ultraviolet (UV) light-cured acrylic (see Dymax <<http://www.dymax.com>>), to the extrusion for rapid and automated manufacturing. In another embodiment, U-shaped channel 18 is formed from a plastic composite and includes a small ledge on which light transfer medium 16 is positioned. Light transfer medium 16 is locked into place by a plastic trim bezel (not shown) which snaps into U-shaped channel 18 overtop light transfer medium 16.

Light source channel 10 is designed to be versatile featuring several ways to control the light output and emitting angles of the LEDs 28. By increasing the diameter of the light transfer medium 16 positioned over LEDs 28, the emitting angle of the light is increased, thus making a less collimated linear beam. By decreasing light transfer medium 16 diameter, the focus and collimation of the beam is increased.

Another way light is controlled in the light source channel 10 is by varying the height of extrusion 12, i.e., the depth of the U-shaped cross-section, and the distance that the bottom of light transfer medium 16 is from the surface of LED 28. Increasing the air gap between the LED die and the bottom of light transfer medium 16 adjusts the light emitted by light source channel 10 to be more diffused and less collimated. When the light transfer medium 16 is closest to the LED die, the light emitted by light source channel 10 is most collimated. Moving light transfer medium 16 further away, i.e., increasing the height of the extrusion channel 18, increases the emitting angle of light emitted from the light source channel 10 and the emitted light appears more diffused. In an alternate embodiment, a reflector or plating (not shown) within the interior of extrusion 12 (such as application of a surface treatment process as in ALZAK available from the Aluminum Company of America or chrome) may also be used to help guide the light into the collimator, i.e., light transfer medium 16, and minimize loss and absorption of light.

In still another embodiment according to the present invention, a reflective or mirrored strip positioned inside of extrusion 12 increases the efficiency of light emitted from light source channel 10. Some light from the light source, i.e., light engine 14, reflects back from the optic or emits from the side of the light source, i.e., light engine 14.

In one embodiment, addition of a reflector 38 (FIG. 3) on an upper surface of circuit board 30 increases the efficiency of light emitted from light source channel 10 by reflecting light back out rather than being absorbed by the extrusion 12 or light engine 14. The reflective/mirrored material comprising reflector 38 extends the length of extrusion channel 18 while having holes, e.g., cut, drilled, punched, etc., positioned where reflector 38 slides over the top of LEDs 28 exposing only the lens of LED 28 or the part of LED 28 actually emitting light. In further embodiments, reflector 38 is either adhered into place or mechanically fastened.

A pair of electrical conductors 40 provide power from a power source (not shown) to light engine 14.

In general, the overall performance of light emitted from LEDs varies due to manufacturing variables. The wavelength of light emitted from LEDs, especially phosphor-based white LEDs varies significantly enough to be detected by the human eye. The quality and consistency of white light is an important aspect of lighting with LEDs for various applications including general lighting, and often times in LED arrays and wall washes (especially against white or plain backgrounds) visible Kelvin temperature variations are noticeable and unpleasing to the eye. The color of white light varies from yellowish-warm white to a cool, blue white; therefore, manufactured LEDs are sorted by luminous output, voltage, and often most importantly color in a process called "binning" Depending on the process and method used for binning, LED light output results vary drastically.

Light transfer medium 16, e.g., the linear optic or half-round described above, utilized in embodiments according to the present invention helps not only to reduce the point sources of visible color temperature variations, but also helps to soften the variations by mixing color variations of more than one LED 28 while evenly collimating the beam of light emitted from light source channel 10. Mixing two varying Kelvin temperature light outputs results in the emission of an average Kelvin temperature light. When the light enters the light transfer medium 16, some of the light is reflected internally within the medium 16 in an effect known as total internal reflection (TIR).

Typically, light emitted from most LEDs is considered directional meaning light is emitted in a forward direction. Back light, or light emitted from all angles as in the case of an incandescent bulb or fluorescent tube where light is emitted in 360 degrees, is minimized. Therefore, in one embodiment, most of the light emitted from LEDs 28 in the light source channel 10 is at an angle perpendicular or close to perpendicular to light transfer medium 16. When the emitted light enters light transfer medium 16, some of the light refracts through medium 16 and some reflects internally. In this situation, the light enters a more optically dense medium, i.e., light transfer medium 16, heading towards a less dense medium, i.e., air. Assuming the angle at which the beam is directed upwards has a angle of incidence of 0 degrees, at an angle of incidence close to 0 degrees, most of the light energy is transmitted across the boundary into the air and very little is reflected. However, some of the light in light transfer medium 16 reflects internally within light transfer medium 16. Light transmitted within light transfer medium 16 at larger angles of incidence increases the amount of reflection and decreases the amount of refraction. In this case, the angle of incidence is increased and when the angle of incidence is equal to or greater than the critical angle for a given combination of materials, the light reflects internally within light transfer medium 16. For example, assuming a combination of water and air materials, the critical angle at the water-air boundary is 48.6 degrees. At the point at which the angle of incidence in water reaches the critical value, the refracted ray of light lies along the boundary having a 90 degree angle of refraction. For any angle of incidence greater than the critical angle, light undergoes total internal reflection. In effect, the color temperature or wavelength of light is scattered/mixed through medium 16 and light is collimated evenly without hotspots or variations in color temperature as in the case where individual collimating optics are used over each LED-28.

A light transfer medium 16 as utilized in embodiments according to the present invention reduces the visual appearance of variation in LED colors due to the angle at which light is emitted from the light source channel 10. Instead of being tightly collimated at a narrow angle as with most light transfer mediums which utilize the LED as a point source with an individual collimating optic, medium 16 collects and transmits light along its length while mixing any varying Kelvin temperatures or wavelengths of light and eliminating any obtrusive color spots.

The above mentioned system is practical in a myriad of linear lighting applications including, but not limited to, signage side lighting, refrigeration lighting, stair lighting, wall washing, and cove lighting.

In both of the above-mentioned embodiments, extrusion 12 serves as a necessary heat sink for high brightness LEDs 28. Depending on the number of LEDs 28 assembled in extrusion 12, the extrusion may or may not be a sufficient heat sink to keep the junction temperature of the LED dies at a desirable level at the ambient temperature of operation to promote the longevity of the LEDs 28. High power LEDs 28 (or other LEDs) as used in an embodiment according to the present invention need external heat sinking (see Lumileds AB07 "Lumen Maintenance of White Luxeon Power Light Sources," AB23 "Thermal Design Considerations for Luxeon 5W Power Light Sources," "The 10 Myths about LEDs and the Luxeon Difference" (Specifically Myth 2)). Therefore, the LEDs 28 in an embodiment of the present invention utilize a thermally conducting extrusion 12, as mentioned previously, most commonly made/extruded/formed/cast out of aluminum. Depending on outside factors of the system including, but not limited to, the thermal resistance of the epoxy used, the thermal conductivity of extrusion 12, the mass of extrusion 12, the surface area of extrusion 12, and the operating temperature/ambient of the system environment, the light source channel 10 may or may not require external heat sinking. In most applications utilizing higher power LEDs (greater than ½ Watt), a plurality of tightly spaced LEDs, or an application requiring high temperature operating environments relative to the maximum LED junction temperature, an external heat sink will be required. Most system design considerations depend on the environment of use, i.e., ambient operating temperature and the desired/necessary lifetime of the system. For example, a certain aluminum 12" extrusion 0.75 wide, and 5" deep with 9 W of LED power if powered in a normal ambient (70 F) environment requires external heat sinking to promote LED life longevity. However, the same aluminum strip used as a drawer light in a freezer where the ambient is below 0° F. and the light is only powered for short periods of time (time a drawer is opened) requires no additional heat sinking because the environment acts as an active cooling system. However, in either case, extrusion 12 is made of a thermally conducting material, and the LEDs 28 are in contact with this material.

The size, shape, length, and design of extrusion 12 are mostly dictated by the application of the system. In some cases, grooves are cut/cast/extruded in the sides of the extrusion to act as fins and increase surface area of extrusion 12. Standard sizes and configurations are made, but in accordance with a light source channel 10, an infinite possibility of combinations and variations on the existing design can be configured to meet the specific power requirements, heat requirements, and application requirements of a specific system. Unlike other systems, embodiments of the present invention are based around the need of the customer and are completely customizable in order to maximize the useful light while minimizing cost. Multiple sizes of extrusions and acrylic lenses are usable in conjunction with embodiments according to the present invention.

Figure 2:
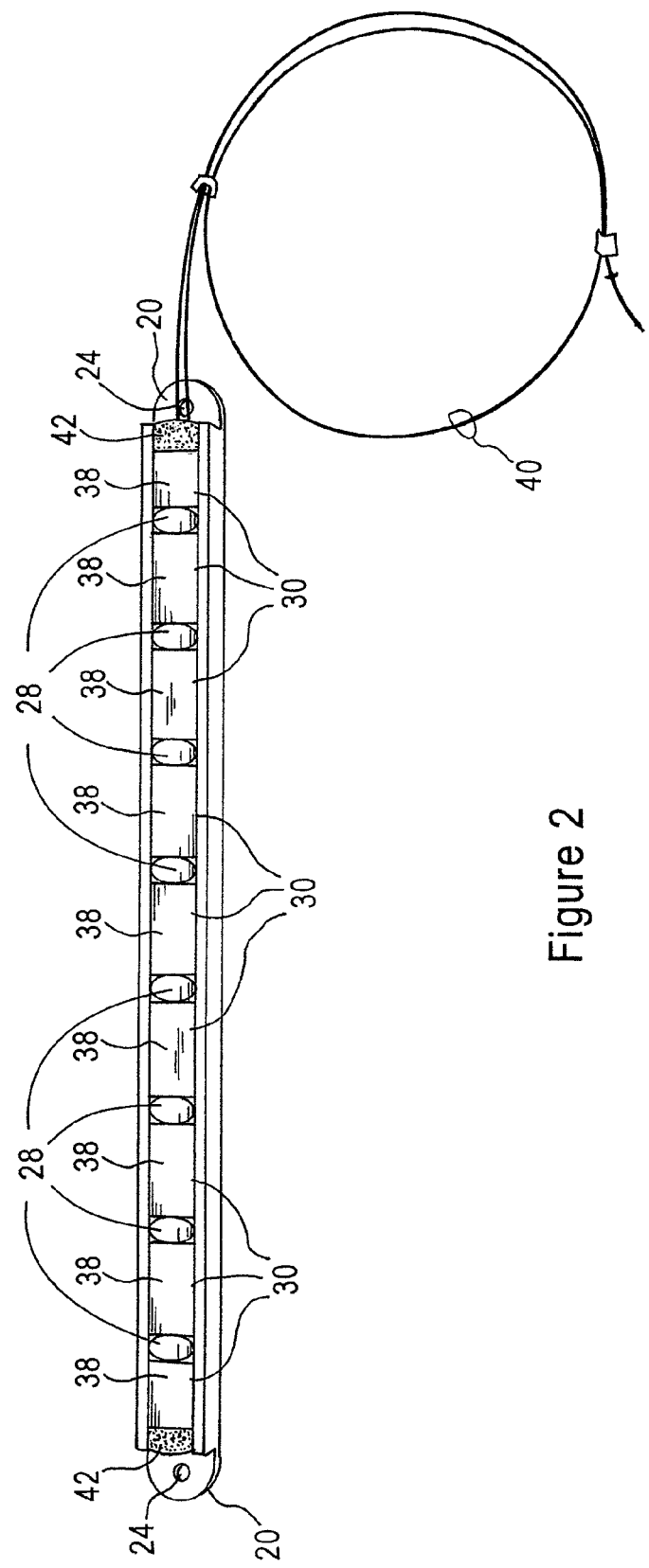
FIG. 2 is a top and side view of the FIG. 1 embodiment.
Figure 3:
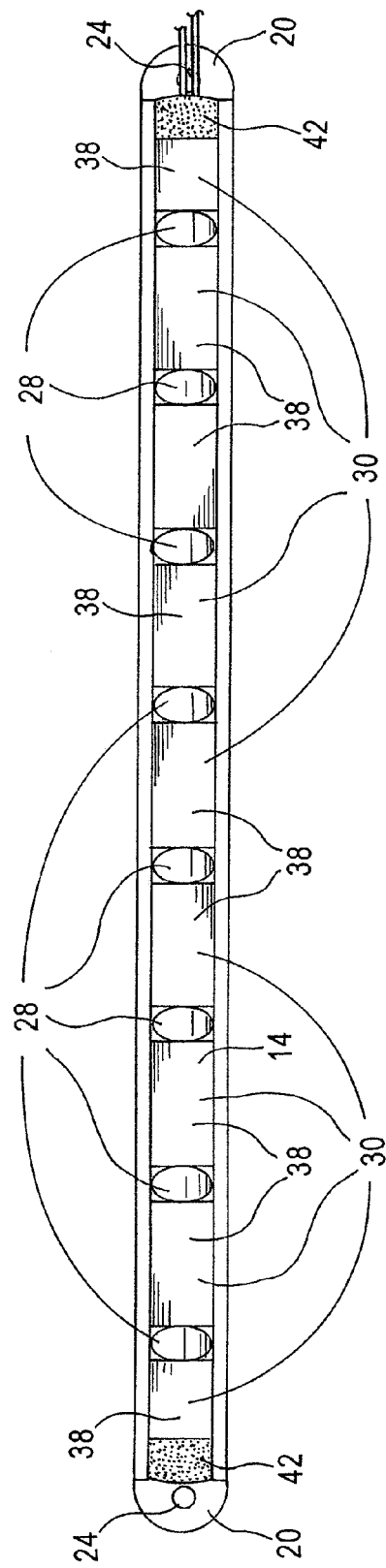
FIG. 3 is a top view of the FIG. 1 embodiment.

The body of extrusion 12 is mounted via various methods. One method utilizes a cast extrusion in which mounting holes, e.g., holes 24 described above, are cast and machined on the ends of the strip as shown in FIGS. 1-3. Longer strips requiring additional heat sinking, pemserts/pem studs are mounted through the bottom of the extrusion to an external heat sink prior to the window/lens covering the LED emitters. This increases contact of extrusion 12 with the external heat sink for optimal heat transfer.

In embodiments requiring external heat sinking, extrusion 12 is attached to the additional heat sink or heat transferring body (not shown) by various methods, but not limited to, the above-discussed screwing/fastening the body of extrusion 12 to the heat sink. Additionally, in alternate embodiments, a thermal medium (not shown) such as a thermally conductive epoxy, thermally conductive transfer tape (such as those from 3M or Thermagon), or a thermally conductive grease is applied between extrusion 12 and the external heat sink. The thermal medium should be as thin as possible in order to decrease thermal resistance but at the same time fill gaps, scratches, and texture of extrusion 12 and the external heat sink. Extrusion 12, e.g., an aluminum extrusion, may also be cooled via active cooling such as installation inside refrigeration units or other traditionally low temperature environments.

In a further embodiment, a plurality of LEDs and LED MCPCBs/PCBs or OLED, LEP-based light sources exist within light source channel 10. The need for multiple PC boards within one extrusion is driven by the manufacturing limit of the individual PC boards. For example, 8' (eight feet) of light emitting area may require 8, 12" (twelve inch) PC boards. In such cases, LEDs 28 on these boards in alternate embodiments are wired in series, parallel, and/or series-parallel combinations. When dealing with quantities of high powered LEDs 28 wired in series, multiple LED drive units (not shown) are used, as detailed below. In one embodiment, multiple wires are used for multiple drivers. Therefore, for longer extrusions, a wire harness for each additional light source channel 10 is laid/fastened/adhered inside of extrusion 12. For larger harnesses, a channel is cast, machined, or extruded into extrusion 12 to lay the wire harness into in order to avoid interference with the light emitted by the light engine 14 and to promote internal aesthetic appearance.

In an alternate embodiment, the PCB or MCPCB replaces the above-described wires interconnecting boards by copper traces on circuit board 30. Each circuit board plugs into each other via connectors mounted at each end of circuit board 30. Jumpers or zero Ohm resistors may be used to select which pins or sockets of the connector carry current to the LEDs thereby determining which and how many LEDs are powered. This method of powering LEDs within extrusion 12 eliminates the need for wires and harnesses and conserves space, simplifies the manufacturing process, and removes extra connections all of which are additional points of possible electrical or mechanical failure.

Most LED systems utilizing high power LEDs as such are most often utilized in systems with external driving/powering electronics. An embodiment according to the present invention described utilizes two types of driving systems. One way of using the system is the traditional method of using an external power supply connected to extrusion 12 using electrical conductors 40. However, an alternate embodiment of the present invention includes the driving system inside extrusion 12.

The drive system is mounted inside extrusion 12 in two methods. A first method mounts an LED SmartDriver (the subject of U.S. Provisional Patent Application No. 60/560, 294 filed Apr. 8, 2004, incorporated by reference in its entirety herein) inside the actual extrusion 12 near the LEDs 28. The second method, and generally more efficient manner, is to mount the actual drive circuitry, e.g., the circuitry of the SmartDriver, on the same MCPCB/PCB on which LEDs 28 are mounted. This method eliminates wiring, eliminates external drivers, and saves space. The use of a metal core PCB also transfers the heat generated from the power components of the driver to the rest of extrusion 12 acting as a heat sink allowing the driver to be run at higher ambient temperatures and efficiencies.

This system is not only new, but is an improvement on the inefficiencies of existing designs using extrusions as a housing for LEDs. Because of the ability to more accurately control and collimate the light, much of the loss from light scattered within the extrusion and diffused while exiting the extrusion is eliminated.

Further advantageously, in comparison with similar patents including "lens stripes" to collimate light is the present approach's low cost versatility. According to one embodiment, the lenses are stock acrylic half rounds and corner angles already extruded in various sizes and lengths. The utilization of an already existing material manufactured in great lengths easily allows custom cut lengths for custom rails. No custom tooling or special primary optical design is required although in alternate embodiments custom designed molds and optics are utilized for greater efficiencies.

With the appropriate LED driving techniques and system, the units are made of custom lengths and wired in series or parallel or a combination of the two. The quick disconnects at the ends of each of the extrusions in the system allow for easy coupling of units together via quick disconnects or other means of electrical connection including waterproof contacts and connectors. For longer lengths, if the LEDs 28 are not all able to be wired in series, proper wire management allows for a harness to be inserted into the extrusion that runs parallel to the strip of LEDs 28. A light system according to the present invention enables runs of great continuous distances with no breaks, interconnections, shadows or spaces.

In alternate embodiments, the light source channel 10 is equipped as having either indoor or outdoor (waterproof) specifications. With an indoor system, the half round is easily slid into the extrusion via a track, e.g., groove 36, and the ends are plugged with inserts 42 (FIGS. 1 and 3), e.g., rubber stoppers. For waterproof designs, the extrusion is potted via an optical or clear epoxy (or any silicone or other sealant).

One method for rapid production of the light source channel 10 includes an ultraviolet (UV) curing adhesive. The adhesive is dispensed between the junction of the half round and the extrusion 12. Next, extrusion 12 is placed on a conveyer belt and fed through an automated UV curing oven. The epoxy cures in less than 10 seconds.

Manufacturing of the system is performed quickly and at a low cost due to the materials involved and the method of manufacture. Extruded materials such as acrylic and aluminum or other metallic is performed cost effectively and in large lengths and the systems are customizable simply by cutting the extrusions to length. LEDs 28 are placed, epoxied (when applicable), and soldered via an automated pick and place machine as well as the driver components (when applicable). The light engine 14, e.g., PC board including LEDs, is then fastened or epoxied to extrusion 12.

In alternate embodiments, LED 28 placement inside extrusion 12 is staggered, linear, and a combination of staggered and linear.

Light source channel 10 is not limited to using a half round of polished acrylic for light transfer medium 16. Alternate embodiments include using a flat window, convex lens, round lens, triangular lens or any other acrylic, polycarbonate or clear composite material for transferring, diffusing, or refracting, or collimating light.

Advantageously, an embodiment according to the present invention:
Enables use of LEDs, OLEDs, LEPs and related semiconductor materials as a light source;
Provides a completely expandable system; —Enables changing the radiation pattern;
Enables any size extruded U channel L×W, and any size round or other shape to direct and collimate light;
Wiring to LEDs can be enclosed inside the extrusion;
Usable with any type of Light Emitting Diode regardless of Power; and—Usable Indoor/Outdoor.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A system for collimating light emitted from a plurality of light emitting diodes (LED) dies, the system comprising:
a channel comprising a light engine, the light engine comprising a plurality of light emitting diodes (LED) dies positioned within the channel, at least one of the plurality of LED dies emits light at a color temperature different than another one or more of the plurality of LED dies within the channel;
a light transfer medium having a bottom side configured to be positioned a predetermined distance above a surface of the plurality of LED dies and having a top side configured to establish a predetermined emitting angle of light from the plurality of LED dies that traverse the light transfer medium; and
wherein the light transfer medium is configured to collimate light from the plurality of LED dies along a length of the light transfer medium covering the channel within the predetermined emitting angle and to average color temperatures of light from the plurality of LED dies.

2. The system of claim 1, wherein the light engine comprises a circuit board mounted within the channel.

3. The system of claim 2, wherein the circuit board comprises a reflector on a surface of the circuit board.

4. The system of claim 1, wherein the channel is part of an extrusion.

5. The system of claim 4, wherein the extrusion provides a heat sink for the plurality of LED dies positioned within the channel.

6. The system of claim 1, wherein the channel further comprises a plurality of sides with at least one side of the plurality of sides comprising a reflective surface.

7. The system of claim 1, wherein configuration of the predetermined distance determines a range of collimation of light emanating through the light transfer medium.

8. The system of claim 1, wherein the light transfer medium comprises a single optical cover that covers a length of the channel.

9. The system of claim 1, wherein the light engine comprises a driver for controlling one or more of the plurality LED dies.

10. The system of claim 1, wherein the top side comprises a rounded top side with a diameter configured to establish the predetermined emitting angle.

11. A method of collimating light emitted from a plurality of light emitting diodes (LED) dies, the method comprising:

providing, by a lighting system, a channel comprising a light engine, the light engine comprising a plurality of light emitting diodes (LED) dies positioned within the channel, at least one of the plurality of LED dies emits light at a color temperature different than another one or more of the plurality of LED dies within the channel, the channel comprising a light transfer medium having a bottom side configured to be positioned a predetermined distance above a surface of the plurality of LED dies and having a top side configured to establish a predetermined emitting angle of light from the plurality of LED dies that traverse the light transfer medium;

emitting, by the plurality of LED dies, light with different color temperatures;

collimating, by the light transfer medium, along a length of the light transfer medium covering the channel and within the predetermined emitting angle the emitted lighted; and averaging, by the light transfer medium, the different color temperatures of the emitted light.

12. The method of claim 11, wherein the light engine comprises a circuit board mounted within the channel.

13. The method of claim 12, wherein the circuit board comprises a reflector on a surface of the circuit board.

14. The method of claim 11, wherein the channel is part of an extrusion.

15. The method of claim 14, wherein the extrusion provides a heat sink for the plurality of LED dies positioned within the channel.

16. The method of claim 11, wherein the channel further comprises a plurality of sides with at least one side of the plurality of sides comprising a reflective surface.

17. The method of claim 11, wherein configuration of the predetermined distance determines a range of collimation of light emanating through the light transfer medium.

18. The method of claim 11, wherein the light transfer medium comprises a single optical cover that covers a length of the channel.

19. The method of claim 11, wherein the light engine comprises a driver for controlling one or more of the plurality LED dies.

20. The method of claim 11, wherein the top side comprises a rounded top side with a diameter configured to establish the predetermined emitting angle.

* * * * *